June 22, 1965  E. W. ANTHON  3,190,497
LIQUID COLLECTING APPARATUS AND A VALVE THEREFOR
Filed May 28, 1962
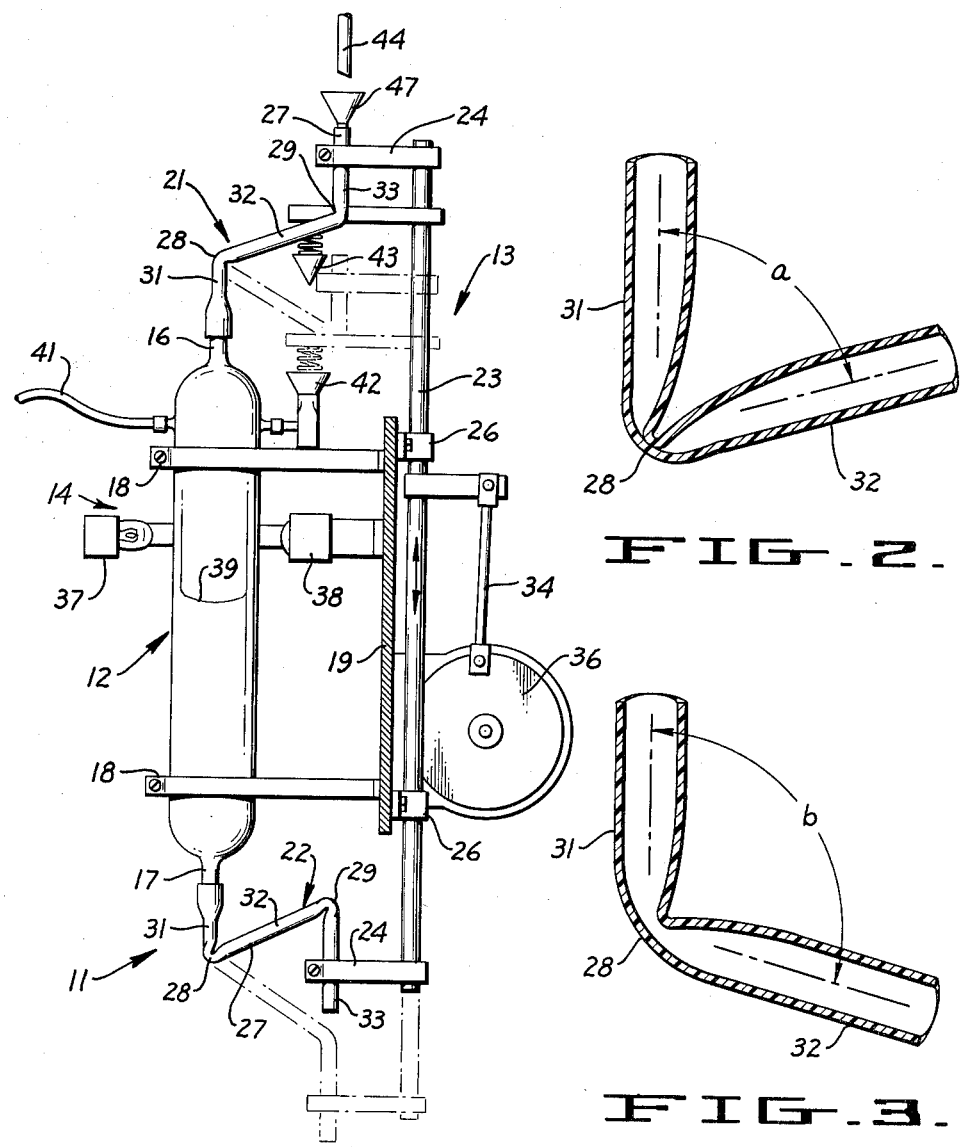
FIG. 1.
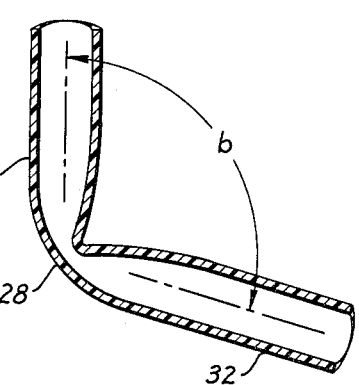
FIG. 2.
FIG. 3.
INVENTOR.
ERIK W. ANTHON
BY Schapp & Hatch
ATTORNEYS United States Patent Office 3,190,497
Patented June 22, 1965

3,190,497
LIQUID COLLECTING APPARATUS AND A VALVE THEREFOR
Erik W. Anthon, Kensington, Calif., assignor, by mesne assignments, to Warner-Lambert Pharmaceutical Company, Morris Plains, N.J.
Filed May 28, 1962, Ser. No. 198,112
12 Claims. (Cl. 222—64)

The present invention relates to improvements in a liquid collecting apparatus and a valve therefor and more particularly to an apparatus capable of collecting and dispensing accurately determined fixed quantities of liquid.

In many industrial processes involving fluid handling, it is desirable to provide a unit capable of collecting a fixed quantity of fluid and dispensing such fixed quantities. Where the amount dispensed is not critical, conventional containers and conventional valves are suitable. However, where it is required to collect and dispense accurately determined quantities, specially constructed devices are required.

The present invention relates to a system in which such accurately determined quantities may be collected and dispensed from a container having specially constructed valves associated therewith. These specially constructed valves are immediately responsive, and provide a careful control of the liquid entering and/or leaving the container.

The system is particularly applicable to but not limited to automated analytic systems where accurate fluid handling and measurement is necessary. For example, in certain analytic processes, fractions of material separated by conventional analytic techniques are to be collected and tested in accordance with known procedures. Since it is necessary to work with a known volume of liquid, it is advantageous to simultaneously measure and collect a fixed volume of the fraction as a sample for further analysis. Such simultaneous operation results in a saving of equipment and provides simplified operation.

In order to provide such a simplified system, it is necessary to provide a valve unit which is immediately responsive to a shut-off operation, leak-proof and yet which is comparatively simple in structure. Accordingly, the present invention also provides such a valve unit. Although the valve is particularly applicable for use as a component of the liquid collector and dispenser of this invention, it is also apparent that the valve also has other independent uses. Thus the present invention also provides an improved valve.

Accordingly, it is a primary object of this invention to provide a liquid collecting and dispensing apparatus capable of collecting accurately measured amounts of material suitable for use in processes where accurate measurement is important.

Another object of the invention is the provision of a liquid collecting apparatus of the character described which is fully automatic in operation and is suitable as a module in an automated program such as automated analysis.

A further object of the invention is to provide a valve for use in a liquid collecting and dispensing apparatus which is immediately responsive to a control element and provides accurate service over a long period of operation.

A still further object of the invention is to provide a valve for use in a liquid collecting and dispensing apparatus which is simple in construction yet which is corrosion resistant and capable of providing a complete seal against leakage.

Further objects and advantages of my invention will appear as the specification proceeds, and the new and useful features of my liquid collecting apparatus and a valve therefor will be fully defined in the claims hereto attached.

The preferred form of my invention is illustrated in the accompanying drawings forming a part of this description, in which:

FIGURE 1 is an elevational view illustrating a typical liquid collecting and dispensing apparatus constructed according to the invention which is particularly adapted to collect adjustably fixed quantities of material from a column such as a chromatographic column;

FIG. 2, a sectional view of a part of a valve utilized in the present invention illustrating the closed position of the valve; and FIGURE 3, a sectional view of the valve structure of FIGURE 2 illustrating the valve in open position.

While I have shown only the preferred form of my invention, it should be understood that various changes or modifications may be made within the scope of the claims hereto attached without departing from the spirit of the invention.

In other words, the fraction collector illustrated may be used to collect liquids from other sources, and the fixed quantity of liquid could be that fixed quantity present between the valve at the entrance and the valve at the exit of the container where adjustability is not required. In addition, the valve structure has utility in other applications as well as in the unit illustrated.

Referring to the drawing in greater detail, there is shown a liquid collecting and dispensing apparatus 11 comprising a container 12, a valve unit 13, and actuating means 14 responsive to a fixed predetermined volume of liquid for operating the valve unit. The collecting container may be any suitable container capable of receiving and discharging liquid. As here shown, the container has an inlet 16 in the form of a tube at the top thereof and an outlet 17 also in the form of a tube at the bottom thereof. The outlet is at the extreme bottom in order to allow complete removal of liquid from the container.

The container may be constructed of any suitable material such as glass or plastic. However, the preferred form of container is transparent so as to provide observation of material therein and operation of photoelectric devices which may be used for automated operation. The container is mounted on suitable clamping devices 18 which are held on a frame 19 which in turn is supported by conventional structure (not shown). Preferably, the support is vertical to provide flow through the tube by gravity or by gravity in combination with other means.

Valve unit 13 comprises a valve 21 at the upper end of the container for controlling the flow of liquid to inlet 16 of the container to control the flow of liquid through outlet 17 at the bottom of the container. As here shown, valves 21 and 22 are similarly constructed and are both activated simultaneously by movable member 23 which is operatively connected to the valves by arms 24.

Activation of the valves between open and closed positions is accomplished by vertical movement of movable member 23 as indicated in phantom in FIGURE 1 of the drawing. In the position shown the upper valve is open and the lower valve is closed, and in the phantom position shown the upper valve is closed while the lower valve is open. In order to provide this movement, movable member 23 is mounted for axial, vertical movement through bearings 26 mounted on the frame 19.

Each valve 21 and 22 comprises a stiff plastic tube 27 having pinched areas 28 and 29 and tube sections 31, 32 and 33 with the tube sections being separated from each other by the pinched areas. Opening and closing of the tube is effected by adjusting the tube sections so as to form an angle with the pinched sections as vertices. Although two pinched areas are shown, it is only necessary to have one such area to provide a valve, and in its broad aspect the invention embraces one pinched area. In the embodiment here shown, two valve areas are provided because two valves are obtainable with no additional material or operation being necessary. Therefore, two pinched areas are preferred in order to give a double seal when the valve is shut off.

The operation of the valve is illustrated in FIGURES 2 and 3 in which the angle defined by the adjacent tube sections as legs and the pinched section as the vertex is shown to control the passage within the tube. Thus when the angle is acute as shown by angle $a$ of FIGURE 2, the tube is closed; and when the angle is obtuse as shown by angle $b$ of FIGURE 3, the tube is open. In general, the closed angle will be between about 60° and 90°, and the open angle will be from about 90° and 120°. Angles below 60° and above 120° are operative but are best avoided in order to minimize strain and excessive wear on the plastic.

It is important that the plastic be stiff enough that the pinched area can be bent to the desired angle by movement of the sections at a distance somewhat removed from the pinched area in order to provide mechanized operation. It is also desirable to use a plastic material having a high flexural strength in order to provide a long, useful operating life. Once the pinched area is provided in the desired position, it remains fixed. This is also due to the stiffness of the tube, which prevents natural return of the tube to the original form.

The desired properties are obtained when the valve tube is composed from such plastics as polypropylene, polytetrafluoroethylene, polychlorotrifluoroethylene, polyethylene and nylon. Polypropylene is especially preferred, because of its superior properties. In a test run, a valve constructed of polypropylene was operated for over a million opening and closing operations without failure before the test was discontinued. Polypropylene also has the advantage of being resistant to corrosion and other chemical action.

Referring again to FIGURE 1, it is seen that rotation or pivotal movement of the tube sections relative to each other at the pinched area is here effected by holding the end sections 31 and 33 in a position parallel to each other and providing axial movement of section 33. This axial movement is provided by corresponding movement of movable member 23 which in turn is rotated in half revolutions by a motor (not shown).

Rotation of the crank arm is controlled by means responsive to the level of liquid in the container. In general, any suitable switch means may be used, and switch means which are adjustable for operating at different volume settings are preferred. A typical switch mechanism is shown in FIGURE 1 where a light source 37 is used to operate photoelectric cell 38. On interruption of the light by the meniscus 39 of the liquid within the container, the photoelectric cell operates a switch activating the motor to move member 23 to the down position. In this position, the upper valve is closed and the lower valve is opened as shown in phantom.

In order to provide more efficient removal of liquid, the container is pressurized by compressed air entering the container through air line 41. Escape of air through vent 42 is prevented by a valve 43 which is also carried on the movable member 23 and seated in the closed position when the member is lowered. When the movable member 23 is raised to the upper position, the vent 42 is opened and pressure is released from inside of the container. It has been found that the valve system here shown is capable of sealing against pressures of 5 pounds per square inch and it is believed that considerably higher pressures can be held by the valve.

In the device illustrated, fractions are collected from a chromatographic column 44, and discharged to one of the sample containers 46 which are moved automatically according to a planned program. In the position shown in FIGURE 1, a fraction is collected as it drops from the column. The sample is then picked up in funnel 47 and flows through open valve 21 and into the container.

As the container fills, the meniscus 39 moves upwards until it activates the photocell which has been previously adjusted at the desired height on the container. When the photocell is activated, the movable member is moved into the lower position and the upper valve is closed to prevent collection of additional liquid. At the same time, the liquid collected drains through the outlet 17 through valve 22 and into sample container 46. This drainage is accelerated by pressure which builds up because lowering of member 23 also closes the vent 42, and allows the pressure from line 41 to build up in the container.

After sufficient time elapses to drain the container, the movable member is moved back to the upper position and another fraction is collected. In this way a series of samples are collected which represent sequential slugs of liquid from the chromatographic column, and this operation is completely automatic. In addition, the valves are kept clean by passage of liquid therethrough, there being no hidden areas or recesses to trap liquid.

It is apparent from the example given that other operations may be carried out with the apparatus of the invention such as the collecting and dispensing of liquids obtained from any source. It is also seen that I have provided a valve structure which is simple and inexpensive in construction yet which is rapid and effective in operation.

I claim:

1. A liquid collecting and dispensing apparatus capable of receiving and delivering a fixed volume of liquid, comprising a collecting container for receiving and discharging liquid, a valve unit containing a pair of valves with each valve disposed at opposite ends of the container and a movable member directly operatively connected to both of said valves to open one valve and simultaneously close the other valve, and actuating means responsive to a fixed predetermined volume of liquid in the container for moving said movable member and operating the valve unit, each of said valves comprising a plastic tube having a pinched area and holding means for holding the tube at an angle on each side of said pinched area, said holding means being relatively movable to adjust the angle of the tube at the pinched area between a closed acute angle and an open obtuse angle.

2. The liquid collecting and dispensing apparatus defined in claim 1, in which the plastic tubes in the valves are composed of polypropylene.

3. The liquid collecting and dispensing apparatus defined in claim 1, in which the movable member is capable of adjusting the closed angle of the tube between about 60° and 90° and the open angle between about 90° and 120°.

4. A liquid collecting and dispensing apparatus capable of receiving and delivering a fixed volume of liquid, comprising a stationary collecting container for receiving and discharging liquid, a valve unit containing a pair of valves with each valve disposed at opposite ends of the container and a movable member operatively connected to both of said valves to open one valve and simultaneously close the other valve, each of said valves being constructed of a plastic tube of a high flexural strength having a pinched area in the central portion thereof with one end of the tube held by and in communication with said container and the other end of said tube being held by said movable member, actuating means responsive to a fixed predetermined volume of liquid in the container for moving said movable member and operating the valve unit, means for pressurizing the inside of the collecting container, a vent on said container for removing said pressure, and a valve on said vent operatively connected to said movable member.

5. The liquid collecting and dispensing apparatus defined in claim 4, in which the container is transparent and the activating means for operating the movable member and operating the valve unit comprises a light source and a photoelectric cell positioned to operate when the container is filled to a fixed pre-set position.

6. The liquid collecting and dispensing apparatus defined in claim 4, in which the plastic tubes in the valves are composed of polypropylene.

7. In a liquid collecting and dispensing apparatus having a container capable of receiving and delivering a liquid and a line in communication with said container, a valve comprising a stiff plastic tube having a pinched section capable of shutting off flow of fluid through the tube when bent at an acute angle and capable of permitting flow when bent at an obtuse angle, said stiff plastic tube being held at one side of the pinched section by connection with the line in communication with the container, and a movable member holding the stiff plastic tube on the side of the pinched section opposite the line communicating with the container, said movable member being movable to adjust the angle of the plastic tube at the bend between an angle of from about 60° and 90° in which the tube is closed and an angle of from about 90° to about 120° in which the tube is open.

8. The apparatus defined in claim 7, in which the plastic tube is composed of polypropylene.

9. The apparatus defined in claim 7, in which the plastic tube has two pinched sections with one end of the plastic tube held by the line communicating with the container and the other end of the plastic tube being held by the movable member with the axis of the tube at the ends respectively parallel to each other and the movement of the movable member being along the axis of the tube end being held thereby whereby movement of the movable member adjusts the angle of the tube at both pinched sections at an acute angle to close the tube at each bend and at an obtuse angle to open the tube at each bend.

10. A valve for regulating fluid flow, comprising a plastic tube having a pinched section, a first stiff section of the tube on one side of the pinched section, a second stiff section of the tube on the other side of the pinched section, and means for rotatably moving said first and second sections relative to each other at said pinched section to adjust the angle of the tube at the pinched section between an acute angle shutting off flow of fluid and an obtuse angle permitting flow of liquid through the tube.

11. The valve defined in claim 10, in which the plastic tube is polypropylene.

12. The valve defined in claim 10, in which the plastic tube has two pinched sections and three stiff substantially straight sections with one stiff section being between the two pinched sections and the other stiff sections being at the opposite ends of the tube and disposed parallel to each other, and in which the means for relativley rotating sections of the tubing at a pivot at the pinched sections effects relative movement of the end sections of the tube in a direction substantially axial of the tube sections.

References Cited by the Examiner
UNITED STATES PATENTS

| | | | |
|---|---|---|---|
| 2,381,505 | 8/45 | Lindholm | 222—56 |
| 2,669,941 | 2/54 | Stafford | 222—373 |
| 2,727,670 | 12/55 | Shore | 222—64 X |
| 2,887,255 | 5/59 | Bauerlein | 222—453 |
| 2,893,595 | 7/59 | Hebard et al. | 222—450 |
| 2,922,613 | 1/60 | Beacham et al. | 251—4 |
| 2,957,606 | 10/60 | Tarukawa | 222—76 X |
| 2,985,341 | 5/61 | Howell | 251—4 X |
| 3,065,880 | 11/62 | Brown | 222—450 |

FOREIGN PATENTS 1,069,913  7/54  France.

LOUIS J. DEMBO, *Primary Examiner.*

HADD S. LANE, *Examiner.*